United States Patent [19]

Bensoussan et al.

[11] Patent Number: 4,623,969
[45] Date of Patent: Nov. 18, 1986

[54] ELECTRONIC TEMPERATURE CONTROLLER FOR HOUSEHOLDING

[76] Inventors: David Bensoussan, 5170, Hingston, Montreal, Quebec, Canada, H3X 3R4; Don Tardio, 2569 rue Taillon, apt: #4, Montreal, Quebec, Canada, H1L 4S7

[21] Appl. No.: 568,392

[22] Filed: Jan. 5, 1984

[30] Foreign Application Priority Data

Jan. 7, 1983 [CA] Canada .................................. 419062

[51] Int. Cl.$^4$ ...................... G05D 23/00; G05B 15/02
[52] U.S. Cl. .................................. 364/505; 165/11.1; 236/47; 236/94; 364/492; 364/557; 364/160
[58] Field of Search ............... 364/140, 141, 142, 143, 364/144, 145, 160–163, 557, 505, 506, 492, 483; 236/47, 94; 165/11, 12, 13

[56] References Cited

U.S. PATENT DOCUMENTS

| 2,873,368 | 2/1959 | Welker et al. | 331/66 |
| 4,095,740 | 6/1978 | Wirth | 236/47 |
| 4,200,910 | 4/1980 | Hall | 364/145 |
| 4,284,126 | 8/1981 | Dawson | 165/11 A |
| 4,294,404 | 10/1981 | Gauuar | 236/94 X |
| 4,316,256 | 2/1982 | Hendricks et al. | 364/557 X |
| 4,428,528 | 1/1984 | Renault | 364/557 X |
| 4,433,809 | 2/1984 | Schulz | 236/47 |

FOREIGN PATENT DOCUMENTS

| 741463 | 8/1966 | Canada . |
| 1035448 | 7/1978 | Canada . |
| 1134474 | 12/1981 | Canada . |
| 1117625 | 2/1982 | Canada . |
| 82/02608 | 8/1982 | PCT Int'l Appl. . |

Primary Examiner—Joseph Ruggiero
Attorney, Agent, or Firm—Robic, Robic & Associates

[57] ABSTRACT

An electronic temperature controller having a great stability and an improved sensitivity to temperature. The controller is designed to operate at preset temperatures depending on the occupancy and/or the presence of light in each of the rooms of a household. A microcomputer supplies control signals to a heating device until the ambient temperature in the room reaches the appropriate preset temperature. To do so, use is made of an electronic regulator of the proportional-integral-differential type. The control signals of course control the amount of energy (i.e. heat) given off by the heating device in the room. This electronic controller permits to regulate temperature automatically and thus save heating energy when the rooms of the house are either unoccupied or not lit. This electronic controller may also incorporate an electronic thermometer, an alarm system and/or a fire alarm. It may also control any appliance in a room depending on a change in occupancy and/or lighting in the room.

23 Claims, 11 Drawing Figures

FIG. 1

|  | BRIGHTNESS IN THE ROOM | DARKNESS IN THE ROOM |
|---|---|---|
| MOTION IN THE ROOM | T1 | T3 |
| NO MOTION IN THE ROOM | T2 | T4 |

ELECTRONIC TEMPERATURE CONTROLLER FOR HOUSEHOLDING

BACKGROUND OF THE INVENTION (a) Field of the invention

The present invention relates to an electronic controller for generating a temperature control signal, which controller employs a microcomputer. The invention more particularly relates to an electronic controller capable of automatically regulating the temperature in each room of a household, depending on whether or not the room is occupied and/or lit.

(b) Brief Description of the Prior Art

The thermostats used for supplying an electrical control signal to a radiator, a furnace, an air conditionner or the like, typically employ a bimetal element which assumes a mechanical position according to the ambient temperature. Such a thermostat is disclosed, by way of example, by Welkel et al. in U.S. Pat. No. 2,873,368. The above thermostats have a limited thermal sensitivity.

Some thermal regulating systems permit to reduce the energy consumption due to heating during certain periods of the day through the use of an electronic or mechanical timer. Such systems are disclosed, by way of examples, in the Canadian patents of Carlson (No. 741,463), Rudolph (No. 1,035,448), Lavine (No. 1,114,474) and Wong (No. 1,117,625). However, as these systems depend solely on their timer, they lack flexibility since they do not take into account unforeseen changes in the occupancy of the room before the preset time.

Another method of thermal regulation consists in lowering the temperature setting before leaving the household and re-establishing the desired temperature setting upon arrival. Such a method does, in fact, reduce energy consumption. However, since this method is not automatic, it is quite inconvenient. Furthermore, the house keeper hesitates to employ this method as he prefers entering his home when it is already at the desired temperature rather than having to wait uncomfortably between the time he has increased the temperature setting and the time the room has reached the desired temperature.

SUMMARY OF THE INVENTION

The present invention proposes an automatic, electronic controller which overcomes the above mentioned drawbacks. This controller comprises temperature sensor connected to an electronic temperature regulator which provides for an improved thermal sensitivity. The regulator increases the thermal stability and therefore provides a greater comfort to the house keeper. The controller also comprises a motion detector and/or a light detector that can be positioned in different rooms of the house in such a manner that any lack of motion and/or light in any given room causes the temperature to drop in that room, thus preserving heating energy consumption. With the controller according to the invention, thermal regulation is accomplished automatically, without requiring any adjustment of the temperature at any time when the heating system is in operation. A digital processing unit ensures rapid adjustment and stability of the new temperature readings through the use of a proportional-integral-differential type regulator which determines the average heating power of the heating element in any room of the home.

The invention therefore provides a temperature control system which is automatic, highly sensitive, rapidly stabilizing and which offers a genuine advantage in the fight against energy consumption.

BRIEF DESCRIPTION OF THE DRAWINGS

The invention will be better understood upon reading of the following description made with reference to the accompanying drawings showing, by way of not limitative examples, some possible embodiments of the controller according to the invention.

In these drawings.

DESCRIPTION OF A PREFERRED EMBODIMENT

Figure 1:
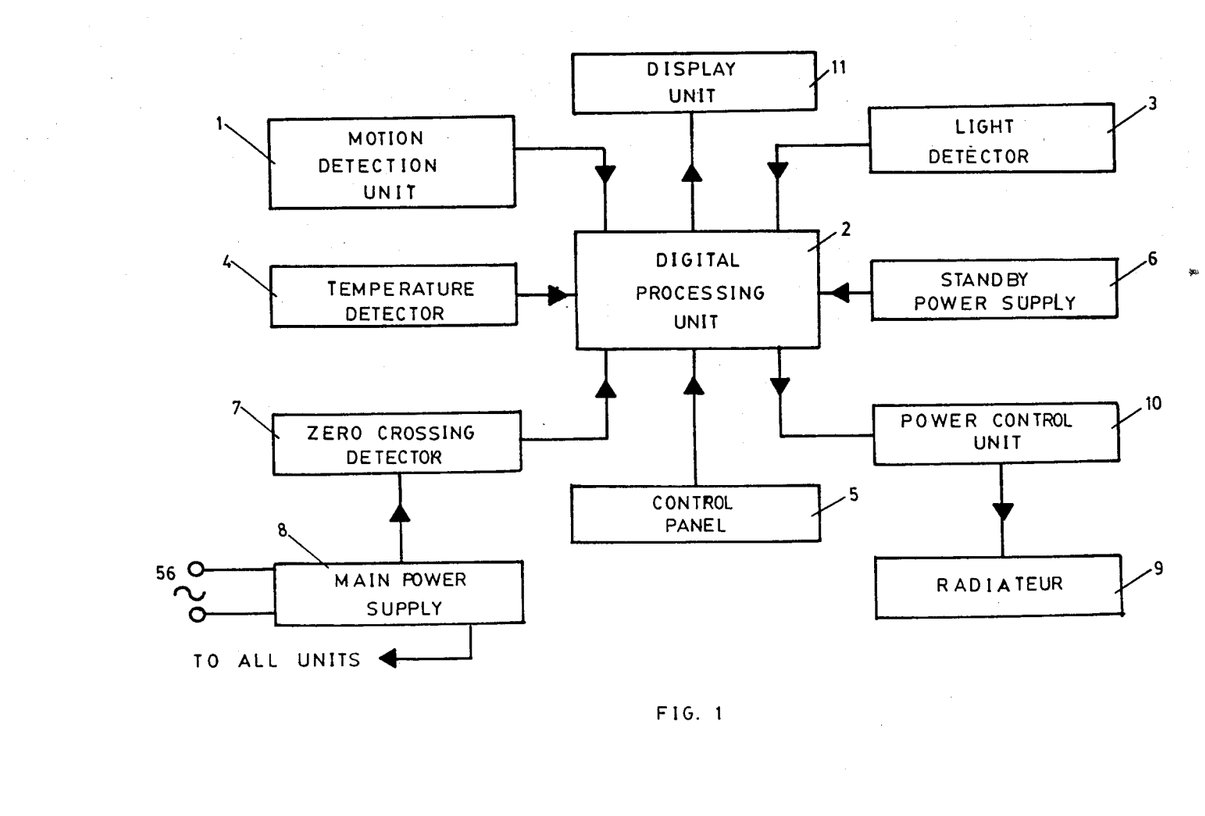
FIG. 1 is a block-diagram of an automatic, electronic controller according to the invention, which controller is sensitive to motion and/or light.

The electronic controller according to the invention as shown in FIG. 1, comprises the following functional elements:

a motion detector unit 1 that transmits information on occupancy in the room to a digital processing unit 2, a light detector unit 3 that transmits information on the presence of light in the room to the digital processing unit 2, and a temperature detector 4 including a thermal sensor, that transmits information on the ambient temperature in the room to the digital processing unit 2.

Figure 2:
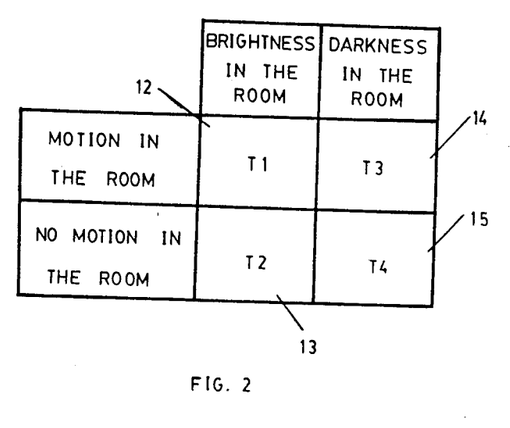
FIG. 2 represents the states of the system corresponding to the different possibilities of presence or absence of motion and/or light.

Four adjustable, preset temperatures corresponding to temperatures desired in the room according to the various possible states of the control system, are stored in the memory of the microcomputer 2 using a control panel 5. As shown in FIG. 2, the possible states of the system are the following: presence of motion and light in the room ($T_1$, 12); absence of motion and presence of light in the room ($T_2$, 13); presence of motion and absence of light in the room ($T_3$, 14); and absence of motion and light in the room ($T_4$, 15).

The electronic controller also comprises the following additional elements:

a main power supply 8 giving a regulated voltage from a standard A.C. supply source 56, for supplying the amplifiers, digital circuits or other circuits of the controller;

a standby power supply 6 which maintains the preset temperature values in the memory of the digital processing unit 2 in the event of a power failure; and a zero crossing detector 7 connected to the power supply 8 to construct a time base for the digital processing unit 2, this time base being used to construct the counters of the unit 2.

The digital processing unit 2 provides readings of the ambient temperature, of the state of the system and of the preselected temperatures stored in its memory and displayed on a display unit 11; it processes these data and delivers a control signal to an electrically controlled heating device or radiator 9 via a power control unit 10.

All the elements of the system except the power control unit 10 are placed in a first module hereinafter referred to as module <1>, located in the center of the room. The power control unit 10 of the radiator 9 is placed in a second module hereinafter regard to as module <2>, located under the cover plate of the radiator 9. This separation is done to prevent the power control unit 10 from influencing the readings from the temperature detector 4. Module <1> and module <2> could however be combined provided that the power control unit 10 is thermally insulated from the thermal sensor of the temperature detector 4.

(a) The motion detector unit

Figure 3:
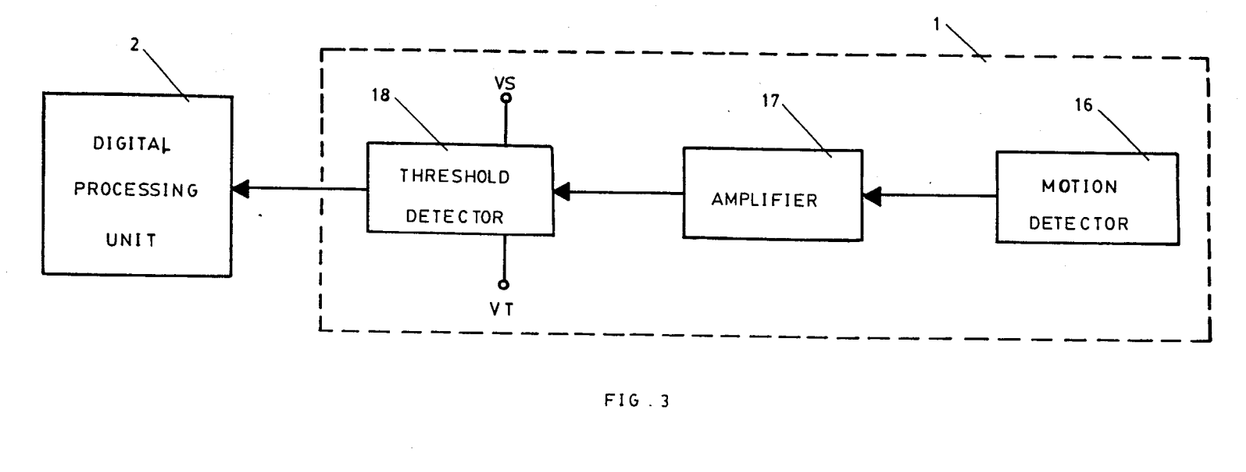
FIG. 3 is a block-diagram of the motion detector unit.

As shown in greater details in FIG. 3, the motion detector unit 1 includes a motion detector 16 using an electromagnetic or ultrasonic source of emission with an adjustable radiating power. The detector 16 may detect motion using anyone of the following kind of detection: doppler effect; detection by variations in the relation of stationary waves emitted by an antenna; infra-red detection; photoelectric cell detection; or detection by use of a relay which feeds information to the digital processing unit 2 on the presence or absence of motion in the room.

The output signal of the detector 16 which corresponds to the presence or the absence of motion in the room, goes through an amplifier 17 with adjustable gain, and also through a threshold detector 18 having adjustable thresholds VS and VT for determining the sensitivity of the detection system. The threshold detector 18 operates flip-flops whose binary state result represents the state of occupancy of the room; this binary state is dispatched to the digital processing unit 2.

It is also possible to detect the binary state corresponding to the state of occupancy in the room from the core of the digital processing unit, by converting the voltage of the output signal of the motion detector into digital form. In this case, the amplification, threshold detection and setting of the state of the system are done in digital form, outside or inside the digital processing unit.

The amplification can be done digitally. The adjustable digital levels of the thresholds may pass through an analog-to-digital converter. They may also be stored in the memory of a digital processing unit, to provide a supplementary digital control of incrementations via the control panel, which supplementary control makes it possible to the numerical levels which are compared to the digital level of the output signal from the amplifier by using logic circuits in order to determine the transitions of the state of the system which start a flip-flop whose output level represent the states of occupancy in the room. Alternatively, it is possible to compare sequences of digital data corresponding to successive samples from the motion detector output signal, in order to detect changes in the state of the system.

(b) The light detector

Figures 4, 5:
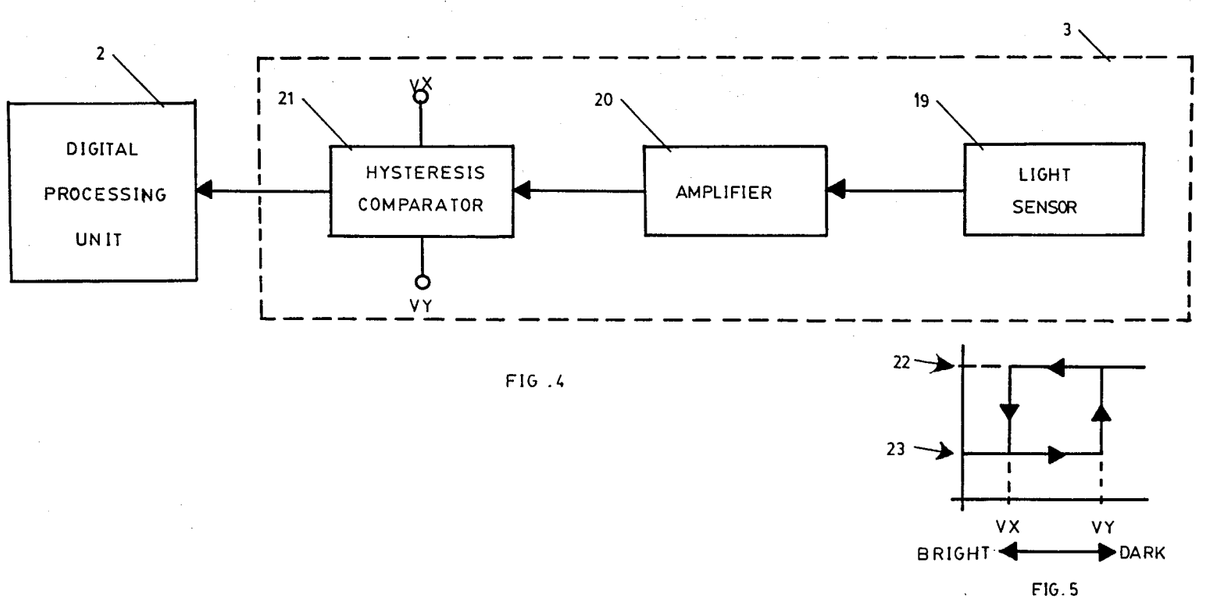
FIG. 4 is a block-diagram of the light detector unit.
FIG. 5 represents the curve of the hysteresis comparator associated with the light detector unit.

As shown in greater details in FIG. 4, the light detector 3 includes a light sensor 19 (photosensitive or phototransistor resistance), whose sensitivity is adjustable. The light sensor gives an electrical output signal which depends on the state of lighting. This signal goes through an adjustable gain amplifier 20 and an hysteresis comparator provided with two adjustable reference voltages VX and VY, so as to avoid oscillations, like in the case of light-dim. The output of the hysteresis comparator is supplied to the digital processing unit.

FIG. 5 represents the hysteresis curve of the hysteresis comparator whose thresholds VX and VY determine the output binary states 22 and 23.

It is also possible to connect the output signal from the light sensor 19 directly to the digital processing unit 2. In this case, the unit 2 will determine the state of lighting in the room along with changes in said state of lighting using numerical operations like those already described in the case of numerical determination of occupancy in the room. The voltages of reference VX and VY may eventually be equal, provided that the reading of the state of lighting in the room or the changes in the nominal temperature readings are done at regular intervals.

(c) The temperature detector

Figure 6:
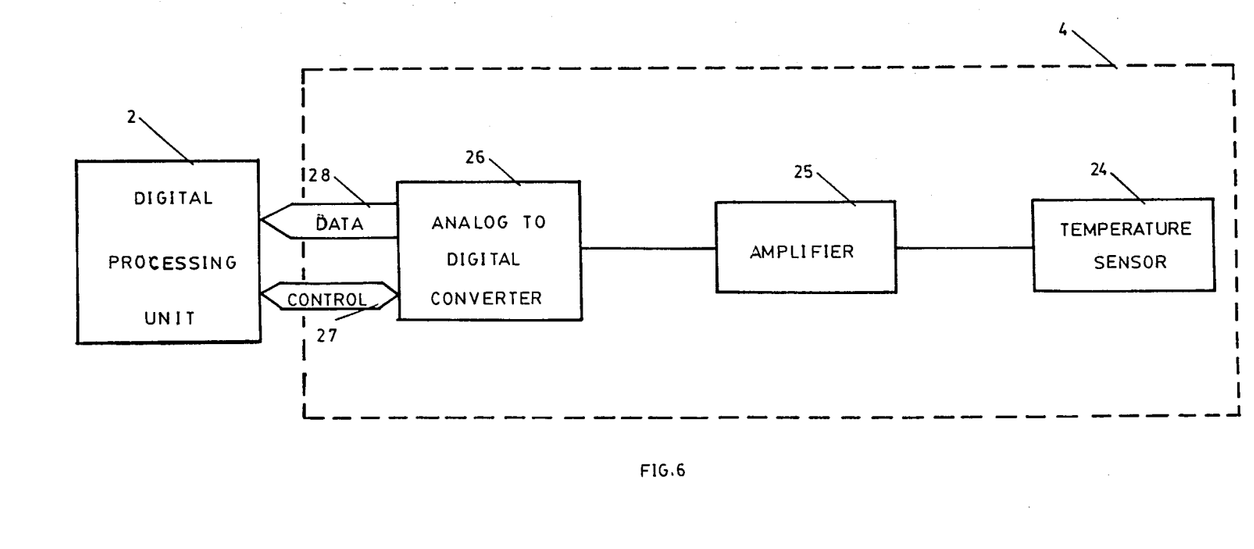
FIG. 6 is a block-diagram of the temperature detector.

As shown in greater details in FIG. 6, the temperature detector 4 includes a temperature sensor 24 (thermistor, semiconducting device or other) having a sensitivity of x mV/°C. The output of the sensor 24 is connected, via an isolation unit, to an amplifier 25 having a gain G, whose output is connected to an analog-to-digital converter 26. This converter may possibly by incorporated in the digital processing unit 2. When the analog-to-digital converter 26 is not incorporated into the digital processing unit 2, a command signal from the latter via a control bus 27 synchronizes the transmission of digital data 28 from the analog-to-digital converter 26 to the unit 2. The adjustable gain G along with two adjustable voltages of reference from the analog-to-digital converter 26 permits to determine the minimum and maximum temperatures of the controller and the sensitivity in temperature, which sensitivity is equal to G . mV/°C. and may be translated in an appropriate number of bits per degree Celsius.

(d) The control panel and display unit

Figure 7:
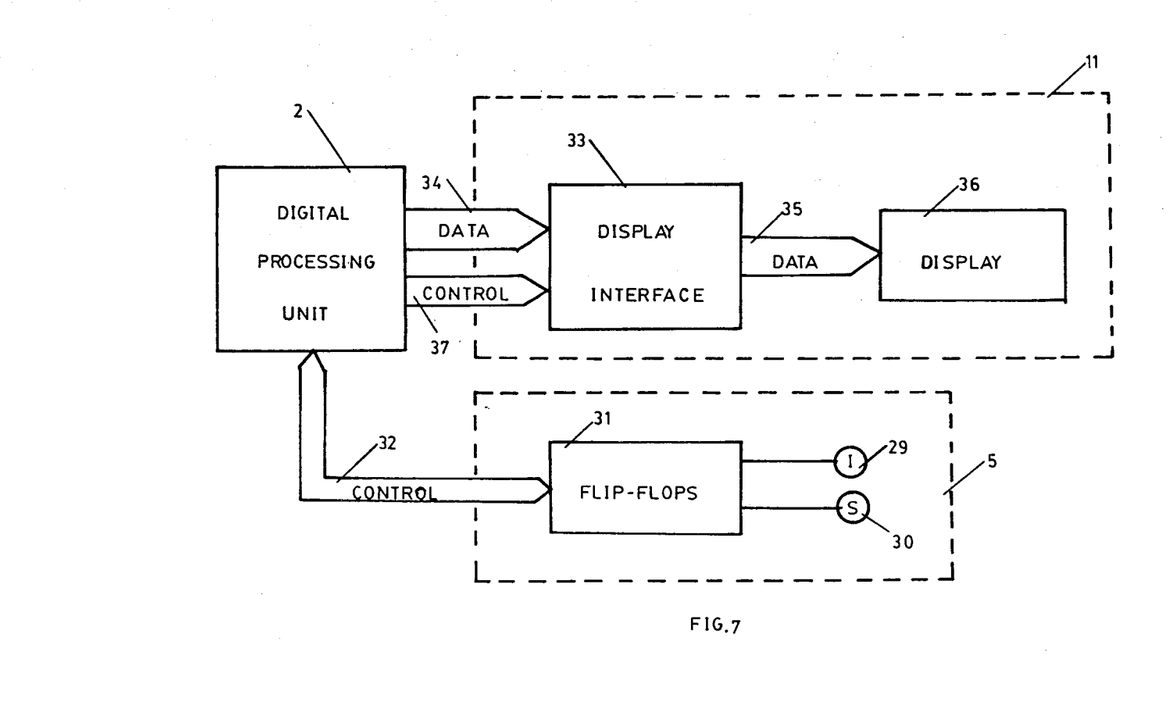
FIG. 7 is a block-diagram of the control panel.

The control panel 5 of the digital processing unit 2 includes two touch commands 29 and 30 which determine from the core of a flip-flops system 31 the selection of the state of the system as well as the desired incrementation. Control signals 32 from the digital processing unit 2 enable sequential readings of these two pieces of information.

The predetermined temperature information corresponds to the state of the systems $T_1$, $T_2$, $T_3$ and $T_4$ which may be adjusted through the use of a potentiometer or may be incremented digitally before being stored in the memory of a display interface 33 forming part of the display unit 11. This interface in turn processes selection date 34 of the actual state of the system and performs decoding operations and amplifying operations to supply date 35 to a display 36. Control signals 32 and 37 enable display of the preset temperatures and of the corresponding state of the system onto the display circuit 36.

(e) Display

Figure 8:
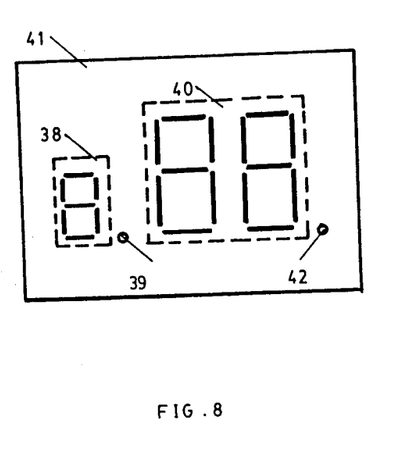
FIG. 8 illustrates the display panel.

The display panel 41 of the display circuit 36 may be made of, for example, luminescent diodes, or may consist in a gas display or a liquid crystal display. The selection of the state of the system 38 and 39 and the corresponding temperature 40 appears on the display 41 under alpha-numerical form. The letters or numbers light up sequentially so that a repeated use permits continual visual display of the above mentioned letters or numbers. A supplementary indicator 42 may indicate if the instant display corresponds to the actual temperature.

An example of simple control that can be carried out by the user, consists in verifying that the temperature reading 40 is incremented as long as the user keeps his finger on the incrementation touch-command 29, while the selection control touch-command 30 is activated. The selected reading of the state of the system 38 and 39 then is representated everytime the selection control touch command 30, is operated. The latter command may be used for commanding successive display of 40, of 38, 39 and 40, of 38 39, 40 and 42, of 42 or of no display at all.

If selection touch command 30 remains activated indefinitely, it is possible to automatically return to a display of the actual temperature at the end of a predetermined period of time.

If incrementation touch command 39 is activated when the command selection 30 is not, it is possible to have a pre-selected display of the temperature corresponding to the actual state of the system.

It is also possible to slightly delay the displays 38 and 39 during variations of $T_2$ to $T_1$ and $T_4$ to $T_3$, in order to enable verification of the operation of the motion detector and the light detector.

(f) The standby power supply

Figure 9:
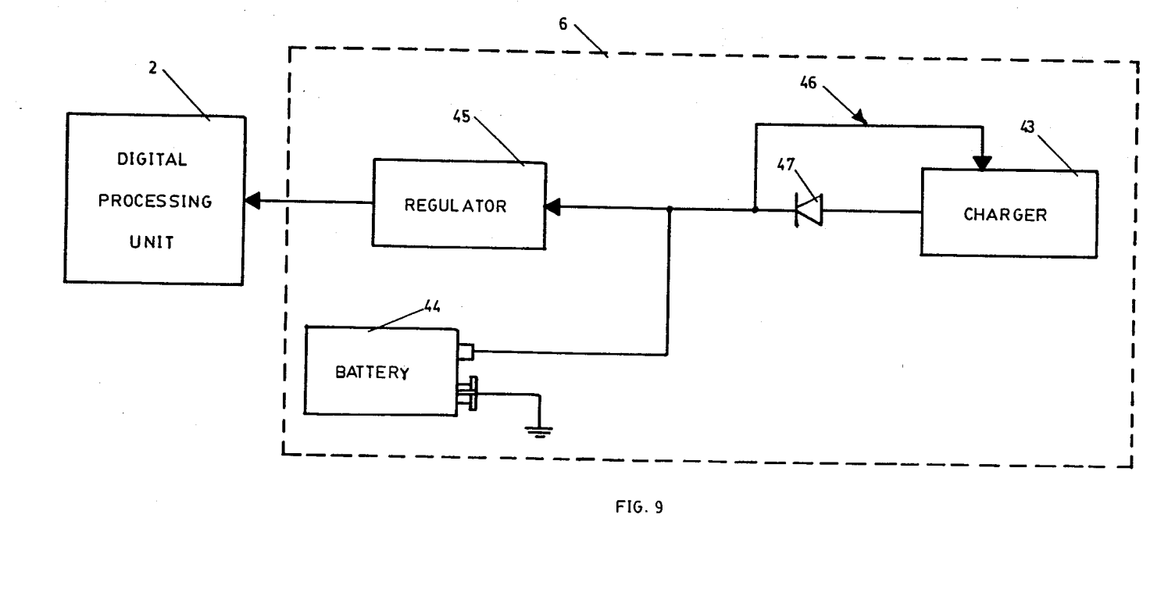
FIG. 9 is a block-diagram of the standby power supply.

As shown in FIG. 9, the standby power supply 6 includes an automatic battery charger 43 connected to a battery 44. The battery 44 supplies a second standby regulator 45, which in turn supplies the memory circuits of the digital processing unit 2. The battery 44 is connected to the standby regulator 45 in the event that the main power supply source 56 is interrupted and the main interrupter of the temperature control system is activated.

The automatic charger 43 operates in such a manner that the battery is charged when its voltage becomes lower than a first threshold. Charge of the battery ceases when the battery voltage overpasses a second threshold.

If the main power supply 56 is interrupted and the battery voltage goes below or above a critical threshold, another threshold detector situated in the standby regulator ceases to supply the memory circuits of the digital processing unit. A supplementary protection consists in preventing the battery from loosing its charge in the automatic charger 46, using, for example, a diode 67.

(g) The digital processing unit

Figure 11:
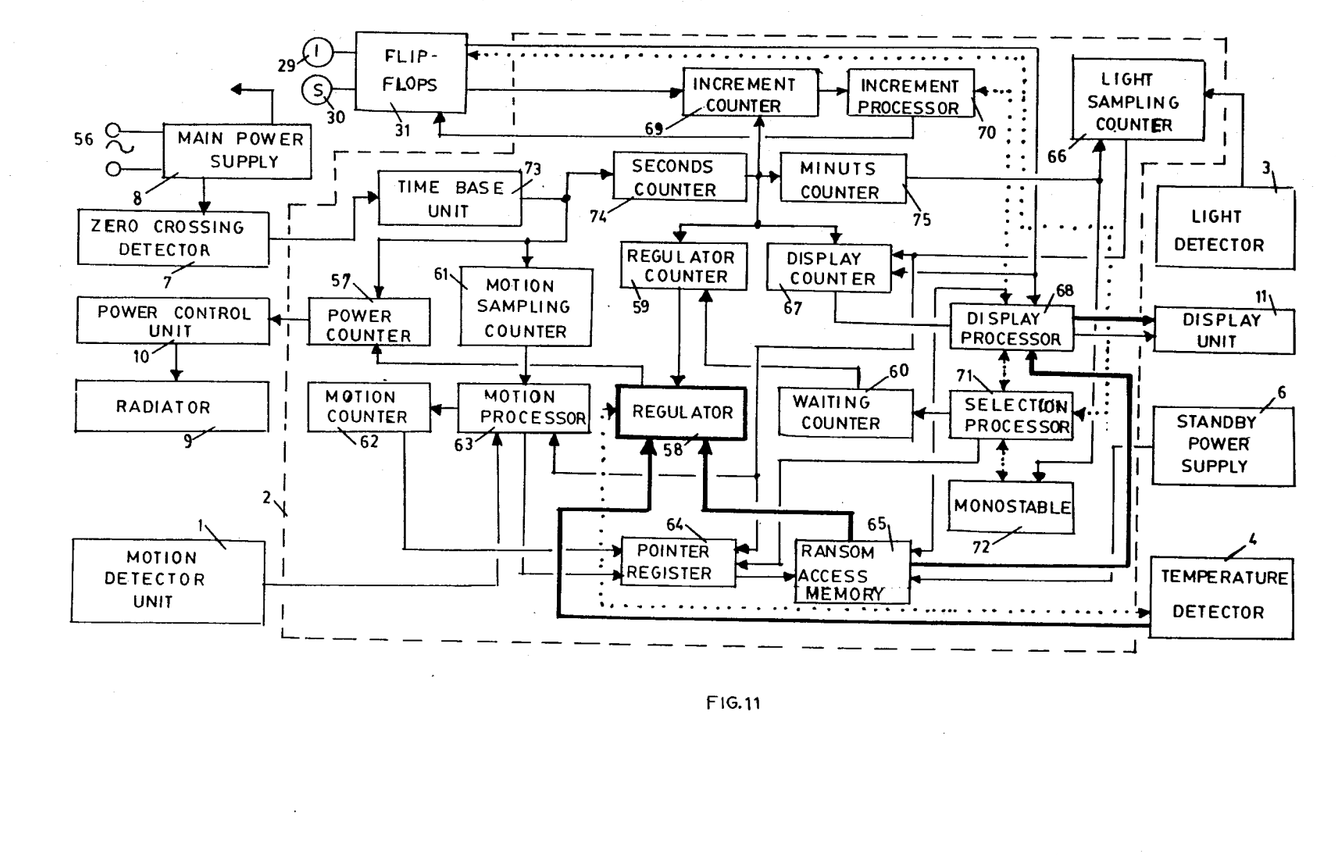
FIG. 11 is a block-diagram of the digital processing unit of the electronic controller.

As shown in greater details in FIG. 11, the unit 2 which may consist of logic units or microprocessors or of a micro- or mini-computer, regularly compares the actual temperature with the desired temperature in order to accomplish a correction of the PID type (proportional-integral-differential), of the difference between these two temperatures. The PID regulator output signal u(t) is a function of the entry signal e(t), which function may read as follows:

$$u(t) = K\left[ e(t) + \frac{1}{Ti} \int e(t)\,dt + Td\frac{de(t)}{u(t)} \right]$$

wherein K, Ti and Td are constants chosen so as to optimize the response of the temperature regulator in terms of mounting time, surpassing, stabilization time and of permanent normal operation.

The above equation may be translated in logic form by one of the logic analysis methods. For example, the PID regulator output u(K) would obey the following law of recurrence:

$$u(K) - u(K-1) = Q_0 e(K) + Q_1 e(K-1) + Q_2 e(K-2)$$

where $Q_0$, $Q_1$ and $Q_2$ are constants related to the constants K, Ti and Td and to the analog-to-digital sampling period To of the digital processing unit 2.

The digital processing unit 2 delivers a command signal which determines the number of cycles per second during which the radiator 9 is in operation. The number of cycles may vary from 0% to 100% of a certain number of cycles of the main supply source. The command signal of the digital processing unit 2 may be a series of impulses which may be treated to form a series of analog modulated impulses (pulse amplitude modulation, pulse width modulation or pulse position modulation), which series is transmitted to the power control unit 10.

Figure 10:
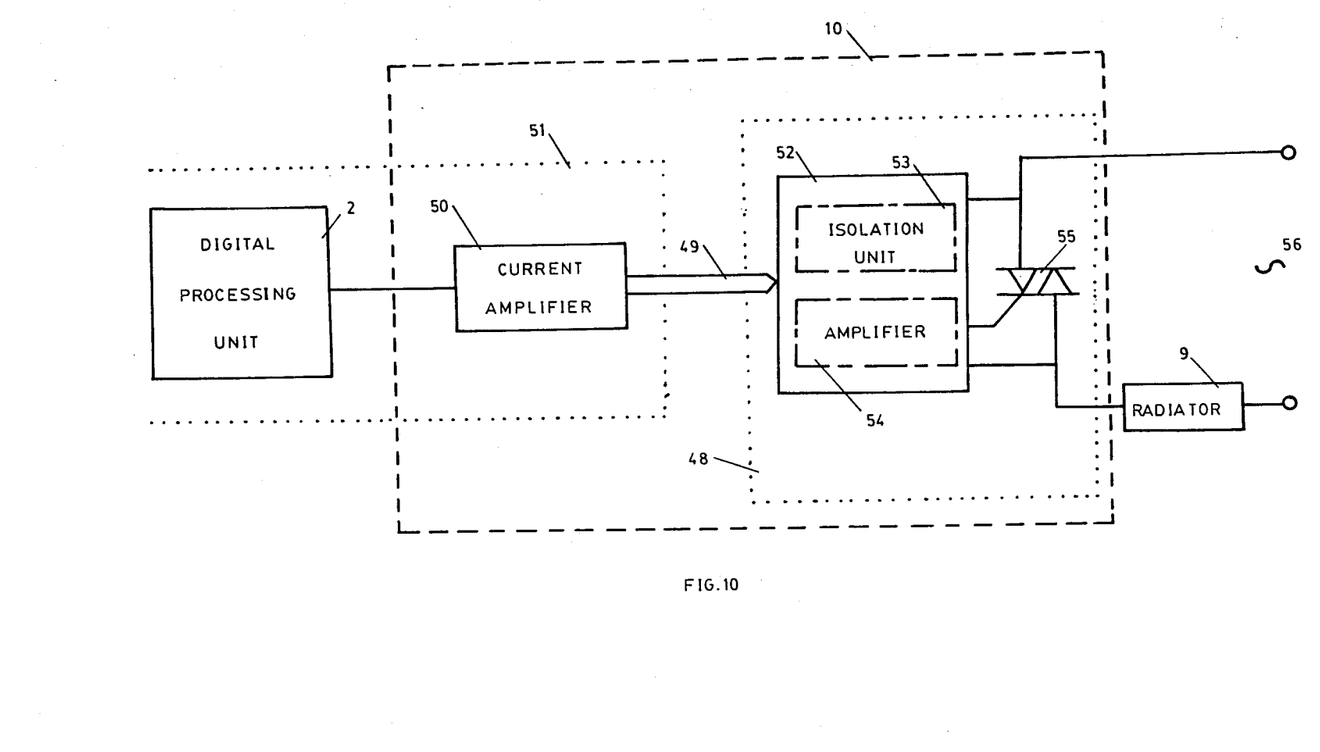
FIG. 10 is a block-diagram of the power control unit.

In the case of a pulse width modulation, the modulated impulse enters via a current amplifier 50 in the module <<1>> numbered 51 in FIG. 10. This modulated impulse is electrically transmitted to an insulating unit 52 including follower amplifier 54 or preferably an electro-optical insulator 53, located in the power control unit 10 inside the module <<2>> numbered 48 in FIG. 10, to trigger a power switching unit such as a relay or a semi-conductor-based switching unit 55 (triac, SCR) connected in series between the radiator 9 and the power source 56.

When the digital processing unit uses a time base derived from a crystal oscillator instead of using a time base derived from a zero crossing detector 7 connected to the power supply 56, it is possible to include a zero crossing detector in the power control unit 10, inside the module <<2>> (numbered 48 in FIG. 10). The output impulses of this zero crossing detector may be used for firing a first power switching device polarized by the width modulated impulse coming from the digital processing unit 2, which switching device is used in turn for firing a second power switching device connected in series between the radiator 9 and the power supply 56.

This kind of switching ensures that the switching time of the radiator occurs during zero crossing detections of the power supply 56, therefore minimizing the possibilities of transients.

Supplementary interface circuits may be added to make the digital processing unit 2 compatible from a technological transistor/CMOS point of view, with the display interface unit 33, the motion detector unit 1, the light detector 3, the temperature detector 4, the control panel 5, the zero detector 7 and the power control unit 10.

The same power control unit can activate a plurality of radiators in parallel; a plurality of independent radiators may also be activated by different power control units controlled by width modulated pulses coming from the digital processing unit 2.

The digital processing unit 2 may be a microcomputer with two working states: a treatment state and a pre-selection state. In the treatment state, the system extracts information from the different detectors and accomplishes the calculation necessary to control the power control unit 10. When the selection control touch-command 30 is activated by the user, the microcomputer reverts to the preselection state i.e. to a state in which the signals conveyed in the power control unit 10 are those which existed before the selection control command 30 and incrementation control command 29 were activated. When the selection control command 30 is no longer activated, after a fixed delay, the microcomputer reverts from the pre-selection state to the treatment state and all the counters of the digital processing unit are re-activated.

The microcomputer software has two main routines. The first routine carries out the following operations: control of the power control unit 10, control of the motion detector unit 1, control of the light detector 3, control of the temperature detector 4, display of new data. Each of the said controls may be sampled at fixed intervals determined by appropriate counters, and by calculation of the terms of the proportional-integral-differential equation. The second routine carries out the following operations: initiation of working variables, initiation of a binary value in the microcomputer memory in order to verify the microcomputer standby power supply, control of the incrementation touch 29, control of the selection touch 30 and initiation of a time delay for the display of the transitions of state of the system. In the case of a power failure, the preselected temperature values are stored in a definite position in the memory thanks to the battery 44. Consequently, the system can resume its operations as soon as power is restored. The microcomputer also carries out a self-test to verify that no error has been introduced in the memory as a result of a potentially defective battery. In the case of a failure of the self-test, the system will adjust itself to a fixed temperature value, independent of the state of the system, until the memory is re-programmed. The fixed temperature may act as a starting value for the system.

The counters used in the core of the digital processing unit 2 of the electronic temperature controller according to the invention will now be described. The interconnections between these counters is shown in FIG. 11, wherein the thick lines represent date, the thin lines represent control signals and the dotted lines represent bidirectional control signals.

A regulator counter 59 determines the calculation time of the proportional, proportional-integral or proportional-integral-differential regulation unit 58. The counter 59 also determines the ambient temperature sampling time at the output of the analog-to-digital converter 26 forming part of the temperature detector 4.

A power counter 57 is decremented during the duration of the width modulated impulses associated with the output of the regulator 58. Fs being the frequency of the power supply 56 and K a constant, the radiator 9 is activated for a period of time equal to KX/2Fs, where X can vary from 0 to 2Fs. KX/2Fs represents the time during which the radiator 9 is in operation whereas K(1−X/2Fs) represents the time during which the radiator 9 is off. Switching of the radiator 9 is done via the power control unit 10.

The regulator counter 59 stops functioning when a waiting counter 60 has expired. This allows the regulator to use new preselected values when there is a transition from the pre-selection state to the treatment state.

The waiting counter 60 is activated when the digital processing unit 2 makes a transition from the preselection state to the treatment state. While switching from the treatment state to the pre-selection state, the power counter 57 continues to operate at the value X which existed in the treatment state until new calculation of output values of the regulator is completed.

A sampling counter 61 associated to the motion detector unit 1 determines the successive reading times of the binary state associated with the motion detector unit 1.

A motion counter 62 is initialized following a detection of motion inside a motion processor 63 associated with the motion detector unit 1. This motion processor 63 associated with the motion detector 1 allows change of the temperature serving as a reference to the system (which is situated in the random access memory 65 of the unit 2) via a pointer register 64. The initial value of the motion counter 62 depends on the binary state associated with the light detector 3. The binary state information associated to the light detector arrives via the motion processor 63 and a light sampling counter 66.

The reference-temperature corresponding to the state of the system $T_1$ is maintained for a length of time Y which begins to be measured when the motion detector unit 1 stops to operate. In this way, the room remains heated at a desired temperature even if no one is in the room for a length of time inferior to Y or Z.

The light sampling counter 66 determines the intervals separating the successive binary readings associated with the light detector 3, these readings being transmitted to the pointer register 64 which determines which one of the pre-selected temperature values in memory 65 will act as a reference for the regulator 58.

A display counter 67 determines at which moment the display data is updated. When the digital processing unit 2 is in the treatment state, the display is renewed every Q seconds. When there is a change in the state of the system, the display is modified after a delay of R seconds to permit observation of the changes in the state of the system, while the pointing register is updated instantaneously.

If the incrementation control 29 is activated when the digital treatment unit is in the treatment state, the temperature acting as a reference is displayed for a length of time S. The incrementation control 29 acts via the flip-flop system 31, a display processor 68 and a selection processor 71 on the predetermined temperature acting as a reference for the regulator 58. This predetermined temperature is extracted from the random access memory 65 via the pointer register 64 before reaching the display unit 11.

In the pre-selection state, any activation of the incrementation control 29 triggers the flip-flop 31 which in turn restarts an increment counter 69. Once decremented, the increment counter 69 activates an increment processor 70. The increment counter is reactivated as long as the user exerts pressure on the incrementation control 29. The increment processor 70 updates the memory 65 and the display unit 11 via the display processor 68.

During the transition from the pre-selection state to the treatment state, the selection control 30 restarts the flip-flop 31 which in turn restarts the waiting counter 60 and transmits through the display processor 68, the new data of ambient temperature to the display unit 11. During the transition from the treatment state to the pre-selection state, the selection control 30 triggers the flip-flop 31, thereby allowing the pre-selected temperature values stored in the memory 65 to be transmitted via a selection processor 71, the display processor 68, and the pointer register 64.

Furthermore, a monostable 72 is activated every time the selection control 30 or the incrementation control 29 is activated. At the end of the monostable output impulse, the system returns to the treatment state. Thus, the monostable prevents the system from remaining in the pre-selection state in the case where the user forgets to switch the system back to the treatment state.

The standby power supply 6 ensures preservation of the pre-selected temperature values in the memory 65 in the eventuality of a failure of the power supply 56.

An example of selection of time bases will now be given. In this example, a first time base $B_1$ is derived via a time base unit 73, from the power supply 56 through the zero detector 7. This first time base may for example, be equal to $1/2F_s$ wherein $F_s$ represents the frequency of the power supply 56. From this first time base $B_1$, a second time base and a third time base may be derived in a second and minute counters 74 and 75, respectively.

The first time base $B_1$ may associated to the following counters: motion sampling counter 61 and power counter 57. The second time base may be associated to the following counters: display counter 67, regulator counter 59, increment counter 69. The third time base may be associated to the following counters: light sampling counter 66, motion counter 62 and waiting counter 60.

The length of these counters may be preset in a Read Only Memory. This length may also be adjusted through the use of potentiometers whose output voltage levels are translated digitally by an analog-to-digital converter.

(h) Alternative embodiments

If desired, it is possible to make the temperature regulation system dependent on the motion in the room only, on the light in the room only, or on both of them. In each of these cases, there will be only two states for the systems $T_1$ and $T_2$ or $T_3$ and $T_4$. The conception and realization of the states of a system like the one described hereinabove may be applied to a temperature regulation system depending on the presence of motion only, or on the presence of light only. In such a case, the selection control touch-command 30 has two main selection position. In the case of a system dependant on motion only, the motion counter 62 does not depend anymore on light in the room. It is therefore possible to realize two new independent systems depending on the presence of motion only or on the presence of light only through a judicious choice of a pre-selected temperature values corresponding to the different states of the systems $T_1$, $T_2$, $T_3$ and $T_4$. For example, by fixing $T_1=T_3$ and $T_2=T_4$, the system depends on the presence of motion only. By fixing $T_1=T_2$ and $T_3=T_4$, the system depends on light only.

It is also possible to activate or deactivate an air conditioning system during transition in the states of the system, provided that a state transition detector is added to the digital processing unit 2. With such a detector, it is further possible to activate, deactivate or monitor a circuit for controlling. the power of a ventilating system.

If such a state transition detector is electrically connected to the relays of an alarm system, said alarm system will be activated during the transition from $T_2$ or $T_4$ to $T_1$ or $T_3$.

It is also possible to automatically control a humidifier during the transition from $T_4$ to $T_3$ and so on. It is further possible to use the temperature controller as a fire alarm. To do so, it is sufficient to verify if the ambient temperature goes beyond a predetermined maximum threshold for more than a determined period of time.

It is also possible to reduce the number of modules <<1>> numbered 51 in FIG. 10 in the home by connecting a certain number of modules <<2>> numbered 48 in FIG. 10 located in different rooms to the same module <<1>>. It is also possible to use a plurality of modules <<1>> with a lesser number of radiators 9 or to provide a uniform temperature in the home depending on the states of the systems in different sections of the home. It is also possible to control heating of a furnace of a central heating system so that the motion detector(s) and/or light detector(s) detect the presence of motion and/or light.

It is further possible to provide a choice of modes of operation. Each mode of operation may correspond to a set of memorizable pre-selected values. For example, different values may be provided for the constants of the proportional-integral differentiator in the case of rooms of different dimensions.

Thus, in addition to its normal mode of operation state, the system may offer one or many other modes or options to the user.

In the above disclosure, reference has been made to a temperature controller exclusively used for controlling radiators. It must be understood that the same controller may similarly be used for controlling to an on-off heating system. In this case, the controller modifies the reference temperatures of the heating system depending on the presence of motion and/or light and utilizes a regulation of the proportional type only.

In addition to the temperature control in homes, the controller according to the invention may be used in both commercial and industrial buildings.

The controller described hereinabove can be used for controlling a central heating system provided that the light and/or motion detector be located at key positions inside the house. It can also be used for controlling the temperature in each room of a house through the control of the motorized valves in the cases of hot water or hot air heating systems. It can further be used for activating through relays a ventilation system or an air conditioning system. It may even be used for adjusting the humidity level in a room according to the ambient temperature through the insertion of standard corrections of humidity level according to temperature.

Since many modifications could easily be made to the controller described hereinabove and many different revisions could be added thereto, it should be understood that any matter contained in the above must be interpreted as illustrative only and not limitative.

What is claimed is:

1. An electronic controller for controlling the supply of electrical power to an electrically controlled device in order to modify an ambient temperature, said controller comprising:
- a thermal sensor for generating an electrical signal having at least one characteristic varying according to the ambient temperature;
- at least one detector selected from the group consisting of motion detectors capable of generating another electrical signal having at least one characteristic varying according to the presence or absence of motion in a detection field, and light detectors capable of generating a further electrical signal having at least one characteristic varying according to the luminosity in the detection field;
- a threshold detector associated with each motion detector, said threshold detector giving as output, a binary number indicative of the presence or absence of motion in the detection field of said motion detector;
- a hysteresis comparator assoicated with each light detector, said comparator giving an output, a binary number indicative the presence or absence of light in the detection field of said light detector;
- a programmable memory unit;
- means for loading the memory of said unit with a program of pre-selected temperatures which depend on the binary number given by the threshold detector associated with each motion detector and the binary number given by the hysteresis comparator associated with each light detector;
- means for receiving output electrical signals from said memory, said electrical signals being representative of temperatures corresponding to the binary number given by the threshold detector associated with each light detector;
- means for displaying on a display unit the ambient temperature and signals representative of the binary number given by the threshold detector associated with each motion detector and the binary number given by the hysteresis comparator associated with each light detector;
- means for receiving the electrical signals corresponding to the ambient temperature and those corresponding to the pre-selected temperatures in said memory and for generating, through a regulator unit, a control signal in order to control the duration of power supply to the temperature modifying device, said control signal being a width modulated pulse whose beginning and ending are synchronized to a zero crossing detector connected to the main power supply of the temperature modifying device; and
- means for limiting the minimum and the maximum values of said pre-selected temperatures.

2. An electronic controller for controlling supplying of electrical power to an electrically controlled device in order to modify an ambient temperature, said controller comprising:
- a thermal sensor for generating an electrical signal having at least one characterisitic varying according to the ambient temperature;
- at least one detector selected from the group consisting of motion detectors capable of generating another electrical signal having at least one characteristic varying according to the presence or absence of motion in a detection field, and light detectors capable of generating a further electrical signal having at least one characteristic varying according the lusinosity in the detection field;
- a threshold detector associated with each motion detector, said threshold detector giving as output, a binary number indicative of the presence or absence of motion in the detection field of said motion detector;
- a hysteresis comparator associated with each light detector, said comparator giving as output, a binary number indicative the presence or absence of light in the detection field of said light detector;
- a programmable memory unit;
- means for loading the memory of said unit with a program of pre-selected temperature which depend on the binary number given by the threshold detector associated with each motion detector and the binary number given by the hysteresis comparator associated with each light detector
- means for receiving output electrical signals from said memory, said electrical signals being representative of temperature corresponding to the binary number given by the threshold detector associated with each motion detector, and the binary number given the hysteresis comparator associated with each light detector;
- means for displaying on a display unit the ambient temeprature and signals representative of the binary number given by the threshold detector associated with each motion detector, and the binary number given by the hysteresis comparator associated with each light detector;
- means for receiving the electrical signal corresponding to the ambient temperature and those corresponding to the pre-selected temperatures in said memory and for generating, through a regulator unit, a control signal in order to control the duration of powr supply to a temperature modifying device, said control signal being a width modulated pulse;
- means for limiting the minimum and the maximum values of said pre-selected temperatures.

3. The electronic controller of claim 1, wherein said temperature modifying device is an on-off system.

4. The electronic controller of claim 1, wherein said regulator unit is a regulator of the proportional type.

5. The electronic controller of claim 1, wherein said regulator unit is a regulator of the proportional-integral type.

6. The electronic controller of claim 1; wherein said regulator unit is a regulator of the proportional-integral-differential type.

7. The electronic controller of claim 1, wherein said regulator unit is digital.

8. The electronic controller of claim 1, wherein said regulator unit is part of a microprocessor.

9. The electronic controller of claim 1, including a battery acting as a standby power supply for the memory unit in case of a power failure.

10. The electronic controller of claim 1, characterized in that it is operatively connected to at least two temperature modifying devices.

11. The electronic controller of claim 1, characterized in that the temperature modifying device to which it is connected, is oeratively connected to at least one other controller.

12. The electronic controller of claim 1, wherein a plurality of sets of pre-selected temperatures are stored in the memory unit and means are provided for receiving a particular set of pre-selected temperatures.

13. The electronic controller of claim 1, comprising a motion detector and including means for connecting an alarm system to said electronic controller and means for operating said alarm system whenever said motion detector detects motion in its field of detector.

14. The electronic controller of claim 1 including means for triggering an alarm system whenever the ambient temperature exceeds a predetermined threshold value during a period greater than a predetermined time.

15. The electronic controller of claim 2, wherein the temperature modifying device is a ventilating system.

16. The electronic controller of claim 2, wherein the temperature modifying device is an airconditioning system.

17. The electronic controller of claim 2, including means for connecting a humidity regulation system to the electronic controller and means for activating said humidity regulation system whenever there is a change in the binary numbers given by said threshold detector associated with each motion detector and said hysteresis comparator associated with each light detector.

18. The electronic controller defined in claim 2, further including:
a crystal oscillator;
means to derive time bases for digital processing from said oscillator;
a zero crossing detector connected to the main power supply; and
means to synchronize said zero crossing detector with the width modulated pulse to trigger power switching devices capable of energizing the temperature modifying device.

19. The electronic controller of claim 1, comprising both a motion detector and light detector.

20. The electronic controller of claim 2, comprising both motion detector and a light detector.

21. The electronic controller of claim 2, wherein the temperature modifying device is a combined heating and air-conditioning system.

22. The electronic controller of claim 2, whrein the program of preselected temperatures includes a fixed temperature independent of the state of operation of the controller and wherein means are provided for adjusting the control unit to said fixed temperature under certain circumstances.

23. The electronic controller of claim 2, further comprising means for maintaining a set of preselected temperatures corresponding to a state of operation of the controller for a given period of time after said state of operation has been selected.

* * * * *